April 22, 1969 R. V. POLE 3,440,560
APPARATUS FOR CONTROLLING THE EMISSION OF LASER LIGHT
Filed Nov. 25, 1964
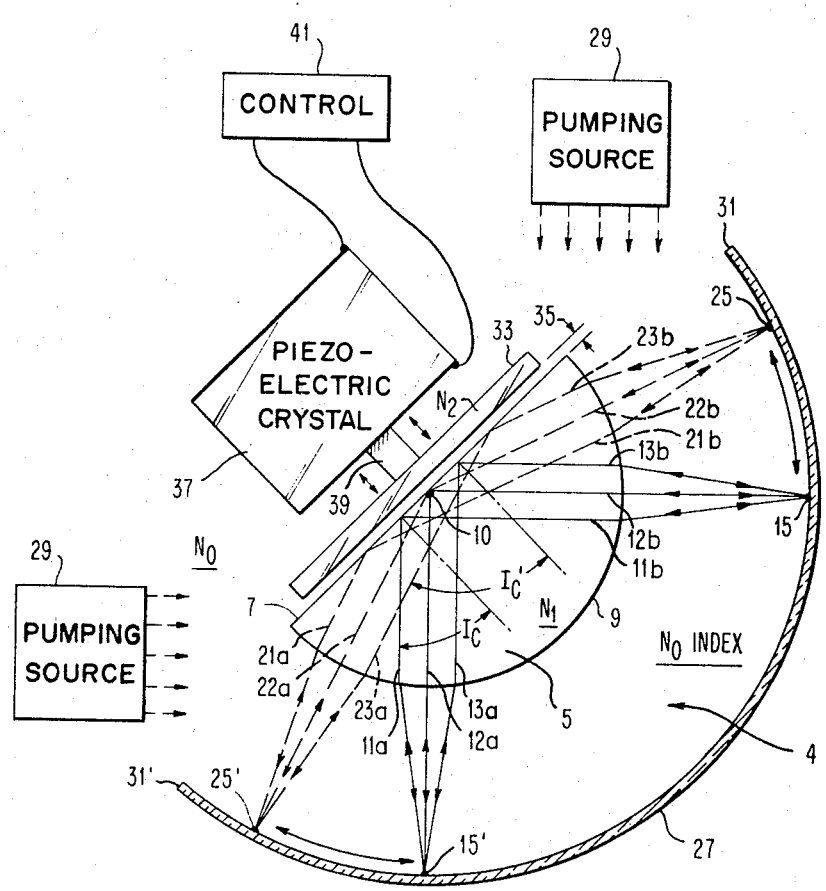
INVENTOR.
ROBERT V. POLE
BY
Edward G. Fiorito
ATTORNEY

United States Patent Office 3,440,560
Patented Apr. 22, 1969

3,440,560
APPARATUS FOR CONTROLLING THE EMISSION
OF LASER LIGHT
Robert V. Pole, Yorktown Heights, N.Y., assignor to International Business Machines Corporation, New York, N.Y., a corporation of New York
Filed Nov. 25, 1964, Ser. No. 413,704
Int. Cl. H01s 1/06
U.S. Cl. 331—94.5                              2 Claims

ABSTRACT OF THE DISCLOSURE

An active laser element having the form of a right semicircular cylinder is arranged to internally reflect laser light striking the diametric surface of the laser element within a given range of angles of incidence. A resonant cavity is created by placing a mirror about the laser element which is concentric with the semicircular surface. The light internally reflected from the laser surface is reflected by the mirror back along the same path thereby setting up a plurality of resonant paths, each having different angles of incidence. By striking the diametric surface of the laser element at less than a given critical angle, light is transmitted through such surface instead of being internally reflected to form a resonant path. The critical angle of incidence is adjustable by providing a transparent member juxtaposed with and spaced from the diametric surface, the latter member having a greater index of refraction than that of the laser element to thereby "frustrate" the internal reflection of the laser element.

---

This invention relates to apparatus for controlling the emission of laser light, and more particularly to apparatus which confines the emission of laser light to a particular area.

Various methods have been used to control the direction of laser light, including rotating mirrors, prisms and birefringent crystals which deflect laser beams passing therethrough. All of these devices change the direction of the laser light after it has been emitted.

Another technique for controlling laser beams is disclosed in commonly assigned, co-pending application Ser. No. 332,617 entitled, "Scanning Laser," by R. V. Pole, application Ser. No. 377,957 entitled, "Laser Beam Switching," by R. V. Pole et al., application Ser. No. 378,220 entitled, "Laser Beam Switching," by R. V. Pole et al., application Ser. No. 412,814 entitled, "Apparatus for Controlling a Laser Beam," by R. V. Pole et al. In these devices the emission of the laser is controlled so that the laser light is emitted only in a selected direction, as opposed to altering the direction of the beam after it has been emitted by the laser. The present invention uses the same technique, but employs a different phenomenon to control the direction of emission, and also differs from the above applications in the shape of the laser cavity in which emission is controlled.

Commonly assigned, concurrently filed application Ser. No. 413,703 entitled, "Laser Beam Directing Appratus," by R. V. Pole et al., employs the same phenomenon as the present invention, but utilizes a different cavity geometry.

It is an object of the present invention to provide an improved apparatus for controlling the area of emission of a laser beam.

It is another object of the present invention to provide simple apparatus which can be constructed and aligned easily for controlling the area of emission of a laser beam.

Still another object of the present invention is to provide apparatus employing the phenomenon of frustrated total internal reflectance to control the area of emission of laser light.

A further object of the present invention is to provide a laser cavity having a new and improved shape.

These and other objects of the present invention are accomplished by providing an active laser element arranged to internally reflect laser light striking a surface of the laser within a range of angles of incidence. A resonant cavity is formed by placing a mirror about the laser. The light internally reflected from the laser surface is reflected by the mirror back along the same path setting up a plurality of resonant paths each having different angles of incidence. Light striking the laser surface at less than a certain critical angle is transmitted through the surface instead of being internally reflected to form a resonant path.

The critical angle of incidence may be adjusted by "frustrating" in the internal reflection. The phenomenon of frustrated total internal reflection is described in an article by I. N. Court and F. K. von Willisen, entitled, "Frustrated Total Internal Reflection and Application of its Principle to Laser Cavity Design," published in Applied Optics, June 1964, vol. 3, No. 6. In accordance with the present invention a transparent member is placed near the surface of the laser. By adjusting the gap between the member and surface the critical angle of incidence is correspondingly adjusted. In this manner the area of emission of the laser is reduced to the sector wherein the angle of incidence is greater than the adjustable critical angle.

The required motion of the transparent member is in the order of one wavelength and can be accomplished quite rapidly to provide a fast adjustment to the area of emission.

Another advantage of the present invention is the simple construction of the cavity and control member which requires no polarizing components or other specialized optical apparatus.

In accordance with another aspect of the present invention the active laser element is formed with a cross-section in the shape of a semicircle. The flat portion acts as the internally reflecting surface, while the lens action of the circular portion focuses light reflected from the surface upon a conjugate surface. The conjugate surface is circular and concentric with the rounded portion of the laser.

A mirror is located in the conjugate surface so that light focused by the lens action of the laser is reflected by the mirror, and returned along the same path to the laser which internally reflects the light and refocuses it upon another portion of the mirror thereby setting up a resonant path.

Control of the area of emission of laser light can be achieved by frustrating the internal reflection at the surface of the laser, or by inserting light limiting devices between the laser and mirror such as those shown in the above co-pending applications.

This cavity includes only a single mirror and is relatively easy to construct and align. Another advantage is the accessability of the point of symmetry of the cavity where various light absorbing objects can be inserted to permanently block a few of the resonant paths in accordance with some preferred pattern of emission.

The foregoing and other objects, features and advantages of the invention will be apparent from the following more particular description of a preferred embodiment of the invention, as illustrated in the accompanying drawing in which a side view of a preferred embodiment of the present invention is shown.

A laser cavity 4 is shown in the drawing capable of emitting laser light in a wide angular area. The area of emission may be limited to a smaller sector in accordance with the present invention.

A laser 5 is formed with a cross-section in the shape of a semicircle. The three dimensional, or solid, geometry of the laser 5 may be a hemisphere or a half-section of a cylinder. In either case the operation at any cross-section of the laser 5 may be described with reference to the diagram shown in the drawing.

Laser 5 includes a flat surface 7 and a semicircular portion 9 centered on a point 10. The laser 5 is composed of any active material, typically ruby, but may also be a junction injection laser, having an index of refraction $N_1$ greater than the index of refraction $N_0$ in the surrounding medium. Due to the change in index of refraction at surface 7 light approaching surface 7 from within laser 5 is internally reflected at surface 7 for certain angles of incidence. The angle of incidence is defined as the angle between a ray striking surface 7 and a line perpendicular to surface 7. The smallest angle of incidence for which internal reflection occurs is called the critical angle of incidence and is designated in the drawing $I_c$.

A group of rays 11a–13a strikes surface 7 at a critical angle of incidence $I_c$. Therefore rays 11a–13a are reflected from surface 7 arriving at the circular surface 9 of laser 5 as illustrated in the drawing by a group of rays 11b–13b. The rays 11b–13b are converged by the lens action of surface 9 to a point 15.

Another group of rays 21a–23a strikes surface 7 at another angle of incidence $I'_c$. The angle $I'_c$ is an altered angle of incidence, the change being made in a manner to be described hereinafter. The rays 21a–23a are reflected from surface 7 and arrive at surface 9 as illustrated in the drawing by a group of rays 21b–23b. The lens action of surface 7 causes rays 21b–23b to converge at point 25.

The rays striking surface 7 at angles of incidence in the range between $I_c$ and $I'_c$ are converged by the lens action of surface 9 to points between points 15 and 25 lying on a curve centered at point 10 and concentric with surface 9. A semicircular mirror 27 is centered on point 10 and includes points 15 and 25. The three dimensional shape of mirror 27 may be either spherical or cylindrical depending upon the shape of the laser 5. Mirror 27 performs the function of reflecting the light focused by lens 9 at points 15 and 25 returning the focused light back along the same path where it is reflected once again by surface 7. The light thus reflected by surface 7 approaches surface 9 once again and is illustrated by rays 11a–13a and 21a–23a. Rays 11a–13a are focused by the lens action of surface 9 at a point 15', while the rays 21a–23a are focused by the lens action of surface 9 at a point 25'.

Mirror 27 includes the points 15' and 25', reflecting light from these points back along the same point resulting in the refocusing of light at points 15 and 25, respectively. Since mirror 27 lies in the two areas where light is focused by the lens action of laser 5 the surface including mirror 27 is referred to as the conjugate surface of laser 5.

In this manner a plurality of resonant paths, two of which are illustrated by rays 11–13 and rays 21–23, are set up within the cavity 4. The cavity 4 is angularly degenerate because it includes a number of paths, or modes, of oscillation having various angular orientations. When the laser 5 is optically pumped by a pumping source 29, typically a helical flash tube, the laser 5 emits light along the paths contained in the area between the point 15 and an edge 31 of mirror 27, and in another area 15' and another edge 31' of mirror 27. The area between points 15 and 15' contains no laser emission since light in this area strikes surface 7 at an angle of incidence greater than the critical angle $I_c$ causing it to be transmitted through the surface 7 so that no resonant paths are set up.

Various methods may be employed for diminishing the intensity of light and therefore suppressing the emission of laser light along certain paths. Several examples are shown in the above co-pending applications. Kerr cells (not shown) may be located in the region between surface 9 and mirror 27 to block a portion of the light reflected from mirror 27. In accordance with another aspect of the present invention, the area of emission is restricted by varying the critical angle of incidence $I_c$. This is accomplished by "frustrating" the internal reflection of light striking surface 7 at angles of incidence greater than a new, or altered angle of incidence $I'_c$.

The frustration is accomplished by employing a transparent member 33 having an index of refraction $N_2$ greater than the index of refraction $N_1$ of the laser 5. The member 33 and surface 7 are separated by a gap 35 in the order of a wavelength of the laser light. When the gap 35 is greater than several wavelengths the critical angle of incidence is the normal one $I_c$ for a material of index $N_1$ and atmosphere of index $N_0$. However as the gap 35 is reduced, light striking surface 7 at an angle of incidence $I_c$ "tunnels" through the gap 35 into member 33, thereby frustrating the internal reflection of this light. The critical angle of incidence $I'_c$ illustrates the smallest angle of incidence for which light is internally reflected from surface 7 when the gap 35 is is the order of a wavelength of laser light.

The angle $I'_c$ can be adjusted by altering the size of gap 35. One method of adjusting the gap 35 is to connect the member 33 to a piezoelectric crystal 37 coupled to member 33 by a link 39. In accordance with the conventional operation of a piezoelectric crystal a field is impressed upon the crystal by a control device 41 producing mechanical expansion or contraction of the crystal resulting in a corresponding expansion of contraction of the gap 35.

When the gap 35 is set so that light striking surface 7 at an angle of incidence smaller than $I'_c$ is transmitted through the gap, the emission of laser light is limited to the area between points 25 and 31, and the area between points 25' and 31'. Adjustment of the gap 35 produces a corresponding variation in the area of emission within the range between points 15 and 31, and the range between points 15' and 31'.

In summary what has been shown is a novel laser cavity employing a single mirror 27 and a semicircular laser 5, each of which is centered on point 10 providing for easy alignment. Light absorbing objects (not shown) may be placed in the vicinity of point 10 to block the reflection of light at surface 7 thereby limiting the area of emission to some desired pattern or shape.

The emission of laser light may be selectively confined to an area by frustrating the internal reflection of light on surface 7 providing a simple control involving no polarizing components, and requiring small mechanical movements in the order of a wavelength of laser light.

While a piezoelectric crystal 37 is shown to mechanically move the member 33 and adjust gap 35, other techniques may be employed for altering the critical angle of incidence $I_c$. For example certain materials exhibit a change in index of refraction when placed in a field. In this modification member 33 may be composed of such a material and a field placed thereacross to adjust the critical angle of incidence $I_c$.

The technique of employing the phenomenon of frustrated total internal reflection to control the area of emission of a laser was illustrated in the semicircular cavity shown in the drawing. However this technique may be employed in other cavity geometries, for example those shown in the above co-pending applications, to control the area of emission.

In accordance with another aspect of the present invention the control technique for the cavity 4 may be replaced with a Kerr cell or other optical control device placed between the laser 5 and mirror 27. For this modification the surface 7 may be coated with a reflecting material so that all rays striking the surface 7 within the laser 9 are reflected.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for controlling the area of emission of laser light, comprising:
   an angularly degenerate laser cavity including, an active laser element shaped in the form of a semicircular lens having a flat surface and a rounded portion, the lens action of said rounded portion focusing light internally reflected by said flat surface on a conjugate surface concentric with said rounded portion, and
   a mirror located in said conjugate surface; and
   control means located adjacent to said flat surface for frustrating the internal reflection of laser light striking said surface at less than a certain critical angle of incidence to limit emission of laser light to an area where the angle of incidence is greater than said critical angle.

2. Apparatus as defined in claim 1 wherein said control means includes a transparent member, and means to vary the separation between said member and surface to produce a corresponding variation in the critical angle of incidence at which internal reflection occurs.

References Cited

UNITED STATES PATENTS

| | | | |
|---|---|---|---|
| 3,279,307 | 10/1966 | Wilks. | |
| 3,291,554 | 12/1966 | Price | 350—285 |
| 3,308,395 | 3/1967 | Sorokin | 331—94.5 |
| 3,344,365 | 9/1967 | Lewis | 331—94.5 |

JEWELL H. PEDERSEN, *Primary Examiner.*

E. BAUER, *Assistant Examiner.*

U.S. Cl. X.R.

350—285